US010078356B2

(12) United States Patent
Abraham et al.

(10) Patent No.: US 10,078,356 B2
(45) Date of Patent: Sep. 18, 2018

(54) APPARATUS AND METHOD FOR SAVING AND RESTORING DATA FOR POWER SAVING IN A PROCESSOR

(71) Applicant: Intel Corporation, Santa Clara, CA (US)

(72) Inventors: Vinit M. Abraham, Santa Clara, CA (US); Ramadass Nagarajan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 172 days.

(21) Appl. No.: 14/831,768

(22) Filed: Aug. 20, 2015

(65) Prior Publication Data

US 2017/0052579 A1    Feb. 23, 2017

(51) Int. Cl.
*G06F 1/26* (2006.01)
*G06F 13/362* (2006.01)

(52) U.S. Cl.
CPC ............ *G06F 1/266* (2013.01); *G06F 13/362* (2013.01); *Y02D 10/14* (2018.01)

(58) Field of Classification Search
CPC . G06F 1/26; G06F 1/32; G06F 13/362; G06F 1/266
See application file for complete search history.

(56) References Cited

U.S. PATENT DOCUMENTS

| 2002/0184547 | A1 | 12/2002 | Francis et al. | |
| 2004/0268278 | A1* | 12/2004 | Hoberman | G06F 1/3203 716/127 |
| 2006/0095920 | A1* | 5/2006 | Goossens | H04L 47/10 719/313 |
| 2009/0282419 | A1* | 11/2009 | Mejdrich | H04L 47/10 719/314 |
| 2010/0318693 | A1* | 12/2010 | Espig | G06F 9/542 710/46 |
| 2013/0054845 | A1 | 2/2013 | Nimmala et al. | |
| 2013/0124896 | A1 | 5/2013 | Park | |
| 2014/0082237 | A1 | 3/2014 | Wertheimer et al. | |

FOREIGN PATENT DOCUMENTS

WO    2004102623    11/2004

OTHER PUBLICATIONS

International Search Report and Written Opinion for PCT/US16/43012 dated Oct. 24, 2016, 13 pages.
International Preliminary Report on Patentability for International Patent Application No. PCT/US16/43012, dated Mar. 1, 2018.

* cited by examiner

*Primary Examiner* — Fahmida Rahman
(74) *Attorney, Agent, or Firm* — Green, Howard & Mughal LLP

(57) ABSTRACT

Described is an apparatus which comprises: an Intellectual Property (IP) block; control logic operable to send a first command to the IP block to cause the first IP block to enter a first power state from a second power state; and a communicating fabric coupled to the IP block and to the control logic, the communicating fabric to send multiple packets with a first header from the IP block to the control logic after the first command is processed by the IP block, wherein the multiple packets are associated with multiple registers which are identified as registers whose contents are to be saved.

19 Claims, 7 Drawing Sheets

APPARATUS AND METHOD FOR SAVING AND RESTORING DATA FOR POWER SAVING IN A PROCESSOR

BACKGROUND

A processor may include a plurality of Intellectual Property (IP) blocks. The term "IP block" generally refers to a logic cell or design which performs a certain function. An IP block may be a reusable unit of logic, cell, or chip layout design that is the Intellectual Property of a party. IP cores may be licensed to another party or can be owned and used by a single party alone. Examples of IP blocks include processor cores, caches, input-output (I/O) transceivers, etc.

In some low power operating modes, most of the IP blocks of the processor (or System-on-Chip (SoC)) may be powered down while the operating system may still consider the processor to be active and ready to continue processing instructions from the time point the processor entered the low power operating mode (or state). Since the operating system expects the hardware (i.e., the processor) to be ready, the entry and exit latency of low power operating mode(s) can significantly impact the performance of the computing system.

For example, the time it takes to save contents of registers in the processor so that the processor may enter a low power operating mode, and then the time to restore the registers back to their original states when the operating system desires the processor to process one or more instructions, constitutes the entry and exit latency of the low power operating mode. A higher latency means a slower response to operating system commands when the processor is in low power operating mode.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
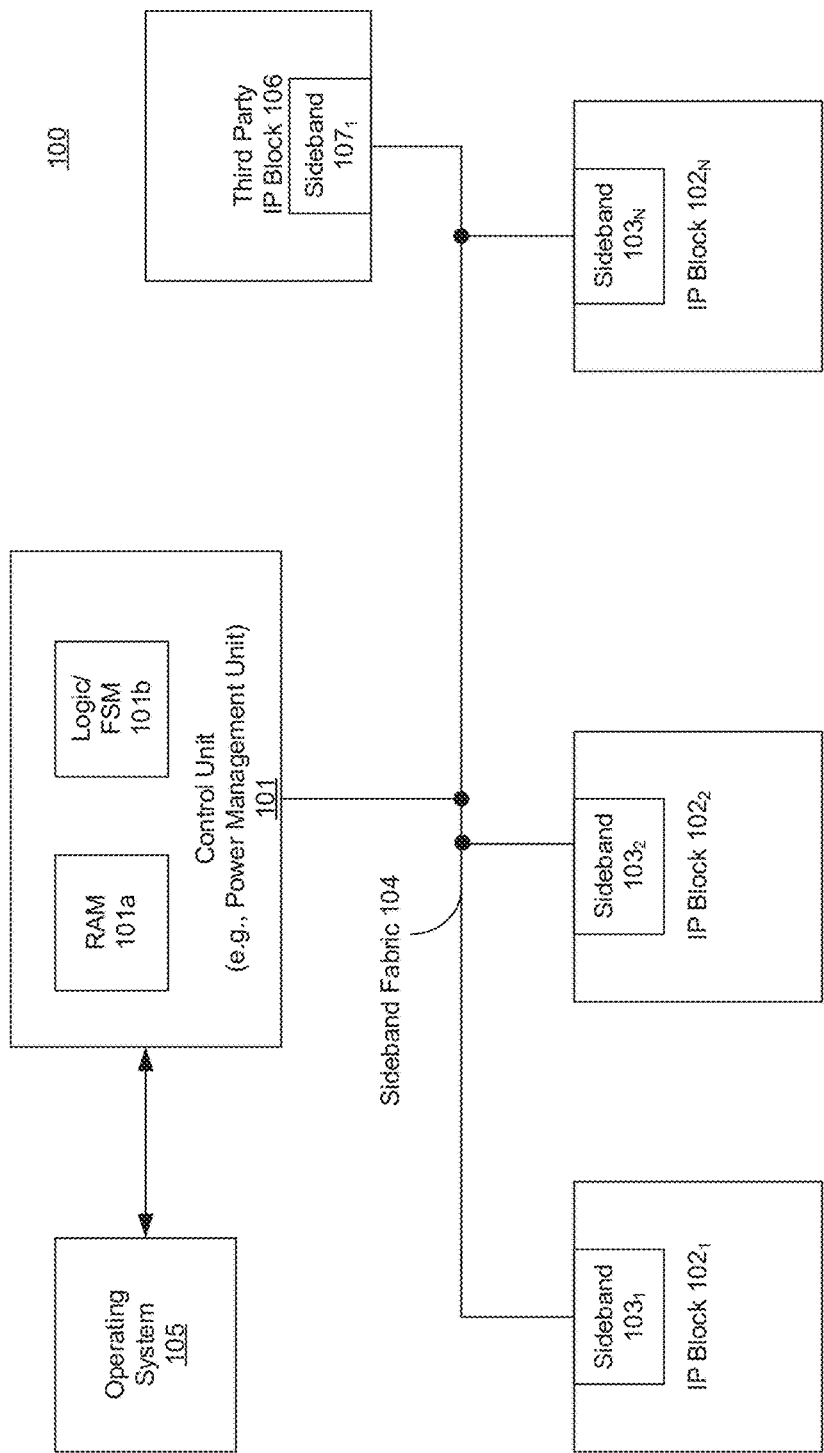
FIG. 1 illustrates a computing system with an apparatus for efficient saving and restoring of data, according to some embodiments of the disclosure.

Some embodiments describe an apparatus and method for saving and restoring contents of registers in a plurality of Intellectual Property (IP) blocks such that the computing system (e.g., System-on-Chip (SoC)) performance increases. As such, more power saving scenarios can be added to the computing system because the computing system can enter and exit from low power states to high power states much faster than known mechanisms.

In one such known mechanism, a Read Only Memory (ROM) is maintained with addresses, data width (e.g., number of bits needed to store the data), etc. of all registers in every IP block of the computing system that need their contents to be saved and restored during power cycles (e.g., entering and exiting power states). These registers are referred to as registers of interest because not every register in an IP block may need to be saved and/or restored. This ROM can thus become quite large because there could be thousands (or millions) of entries in the ROM associated with these registers of interest.

In a traditional saving scheme, during a save event (e.g., just before entering the low power state), a control logic reads each entry in the ROM and forms sideband packets for each register address. It then sends the packets over a communication fabric to the IP blocks in a sequential manner to request the IP blocks to read from those IP registers and send their contents over for saving in the ROM. The IP block processes the request from the control logic, by decoding each packet, retrieving the address content from the packet, and then reading the contents of that register in the IP block. The IP block then sends a new packet over the communication fabric to the control logic with the content of that register corresponding to the address sent by the control logic. As such, the control logic receives, one by one, packets with register data contents from all IP blocks and stores that content in a Random Access Memory (RAM) such that each data content corresponds to a unique register address.

During a restore operation (e.g., when the processor having the IP blocks enters an active state from a low power state), the control unit again reads each entry in the ROM to access the address of the register to be restored, and then retrieves the corresponding data content from the RAM. The control logic then prepares a new packet having the address and the data of the register to be stored in the IP block. This packet is then transmitted over the communication fabric to the IP block. The IP block then decodes the packets and restores the data from the packet to the register of that address. This process is repeated for each register to be restored for all IP blocks.

The traditional save and restore mechanism described above consumes a lot of time. For example, 50% to 75% of the save and restore time is spend in just sending the headers. This adds latency to the performance of the computing system.

Various embodiments described here reduce the save and restore times (e.g., by 50% to 75%) by saving and restoring the contents of the registers on a per IP block basis rather than a per register basis. As such, system performance increases because the exit and entry latency of power states is significantly reduced over known mechanisms. As such, more power saving scenarios can be added where the computing system (e.g., SoC) can enter and exit from. The power saving scenarios and/or states can be any known or to be developed power saving scenarios and/or states. For example, the power saving states can be those specified by the Advanced Configuration and Power Interface (ACPI) Revision 5.0a, Published Nov. 13, 2013.

In some embodiments, the area and power consumption is reduced over the known mechanisms because a dedicated ROM for saving addresses of the registers of interest may no longer be needed (or its needed it's a very small sized ROM). By saving and restoring on a per IP basis, Sideband network congestion over the communication fabric is significantly reduced which further reduces power consumption. Other technical effects will be evident from the various embodiments described here.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about," generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nano tubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

FIG. 1 illustrates computing system 100 with an apparatus for efficient saving and restoring of data, according to some embodiments of the disclosure. In some embodiments, computing system 100 comprises Control Unit 101, plurality of IP blocks $102_{1-N}$, where 'N' is an integer greater than one, I/O interfaces (e.g., Sideband interfaces) $103_{1-N}$, communication bus (e.g., Sideband Fabric) 104, and Operating System 105. In some embodiments, computing system 100 further comprises Third Party IP Block 106 and corresponding Sideband interface $107_1$.

In some embodiments, Control Unit 101 comprises RAM 101a and Finite State Machine (FSM) or logic 101b. In some embodiments, Control Unit 101 is Power Management Unit 101. In other embodiments, Control Unit 101 may be part of any other logic block. For example, Control Unit 101 may be external to a System-on-Chip (SoC), where the SoC includes the IP Blocks.

In some embodiments, IP Blocks $102_{1-N}$ are of the same type (e.g., IP Blocks $102_{1-N}$ are processor cores) or of different type (e.g., IP Block $102_1$ is a processor core, IP Block $102_2$ is a cache, IP Block $102_3$ is a register file, IP Block 106 is an Application Specific Integrated Circuit (ASIC) provided by a third party, etc.). In some embodiments, each IP Block includes one or more registers (e.g., latches, flip-flops, a RAM cell, and/or other types of sequential elements) whose contents need to be saved at power down events.

In some embodiments, IP Blocks $102_{1-N}$ communicate with one another and Control Unit 101 via Sideband Fabric 104. Sideband Fabric 104 can be any suitable communication mechanism. In some embodiments, each IP Block $102_{1-N}$ includes a corresponding Sideband interface. For example, IP Block $102_1$ communicates with Sideband Fabric 104 via Sideband $103_1$; IP Block $102_2$ communicates with Sideband Fabric 104 via Sideband $103_2$; and IP Block $102_N$ communicates with Sideband Fabric 104 via Sideband $103_N$. In some embodiments, Sideband interface comprises a physical layer which is the electrical connection between the IP block and Sideband Fabric 104, and a protocol layer that follows a communication protocol (e.g., data payload size, header information, etc.) for communicating over Sideband Fabric.

Any suitable I/O interface may be used for implementing the Sideband interfaces. For example. Sideband interface is a System Management Bus (SMBus) compliant interface as defined by the System Management Bus (SMBus) Specification, version 3, Posted 16 Jan. 2015; a Fast Management Link (FML) as defined by Intel® Remote Management Module Technical Produce Specification, Revision 1.0

August 2006; or Distributed Management Task Force (DMTF) Network Controller Sideband Interface (NC-SI) defined by DMTF Standard Specification, Version 1.0.0 Jul. 21, 2009. Sideband Fabric 104 can be any communicating interconnect that complies with the electrical specifications of the Sideband interface being used.

In some embodiments, Third Party IP Block 106 can also interface with other IP blocks via its corresponding Sideband 107$_1$. Third Party IP Block 106 can be any IP block from a vendor different than the vendor of IP Blocks 102$_{1-N}$.

In some embodiments, RAM 101a stores the contents of the registers during a power saving mode. In some embodiments, FSM 101b manages RAM 101a. For example, FSM 101b decodes the packets received from IP Blocks 102$_{1-N}$ and Third Party IP Block 106 and stores the register contents in RAM 101a. In some embodiments, FSM 101b encodes packets for transmission to IP Blocks 102$_{1-N}$ and Third Party IP Block 106 to restore the contents of registers in each IP block.

In some embodiments, Operating System 105 instructs Control Unit 101 to enter/exit from one power state to another. In response to the instruction, Control Unit 101 encodes/decodes the packages. The power states can be a variety of power states. For example, power states can be those defined by Advanced Configuration and Power Interface (ACPI) interface, Revision 5.0a of Nov. 13, 2013.

In some embodiments, the register contents of an IP Block can be sent/received as multiple packets or a single combined packet based on the maximum payload supported by the Sideband interface and Sideband Fabric 104. So as not to obscure the various embodiments, some embodiments are described with reference to IP Block 102$_1$ and Sideband 103$_1$. However, the mechanisms discussed for IP Block 102$_1$ are applicable to other IP Blocks of system 100.

In some embodiments, when IP block 102$_1$ is to enter a low power state (e.g., a sleep state from an active state), IP Block 102$_1$ receives a command from Control Unit 101 (which may be initiated by Operating System 105) to save the contents of the predetermined registers in IP Block 102$_1$. Unlike prior art, in some embodiments, the command from Control Unit 101 does not come with a list of register addresses in individual packets to be received by Sideband 103$_1$. In some embodiments, the registers to be saved and restored during entering and exiting a power state are predetermined or marked at the time of design. The contents of these registers are automatically saved when the command to enter a power state is received, in accordance with some embodiments.

In some embodiments, the contents of the registers are concatenated up to the maximum allowable payload size of Sideband 103$_1$, and then a packet (having a header) with the concatenated contents is transmitted by Sideband 103$_1$ over Sideband Fabric 104 to Control Unit 101 for saving. In some embodiments, Control Unit 101 decodes the header of the packet, un-concatenates the payload, and organizes the register contents in RAM 101a. As such, Control Unit 101 is aware of the register contents from IP Block 102$_1$ and the order in which the contents were concatenated. In some embodiments, the order of concatenation determines the contents of the registers. For example, if the register contents are 4 KB, then the first 4 KB of payload may refer to the first register in IP Block 102$_1$, and so on. In some embodiments, the save process happens before the IP block enters a low power state.

In some embodiments, when IP block 102$_1$ is to exit from the low power state (to an active state, for example), IP Block 102$_1$ receives a command from Control Unit 101 (which may be initiated by Operating System 105) to restore contents to predetermined registers in IP Block 102$_1$. In some embodiments, the restore operation happens after the power is back for the IP Blocks. In some embodiments, Control Unit 101 retrieves register contents from RAM 101a for each IP Block in an order in which they were stored (or in any suitable manner in which Control Unit 101 can keep track of the order of the register contents in the received packet and in RAM 101a).

For example, Control Unit 101 retrieves register contents from RAM 101a for IP Block 102$_1$, concatenates the register contents, and prepares a packet (with a header) containing the register contents (i.e., payload). In some embodiments, Control Unit 101 then transmits the packets over Sideband Fabric 104 to IP Block 102$_1$. In some embodiments, IP Block 102$_1$ decodes the packet and provides the register contents to the correct predetermined registers (i.e., the registers of interest). As such, register contents are restored.

In some embodiments, an IP block can power up/down independent of powering up/down of other IP blocks in system 100. For example, a top level power port to an IP block can force the IP block to enter/exit a power state rather than a command from Control Unit 101 while other IP blocks may obey the command from Control Unit 101. In this example, the instruction received by the top level power port may have precedence over the command from Control Unit 101.

Figure 2:
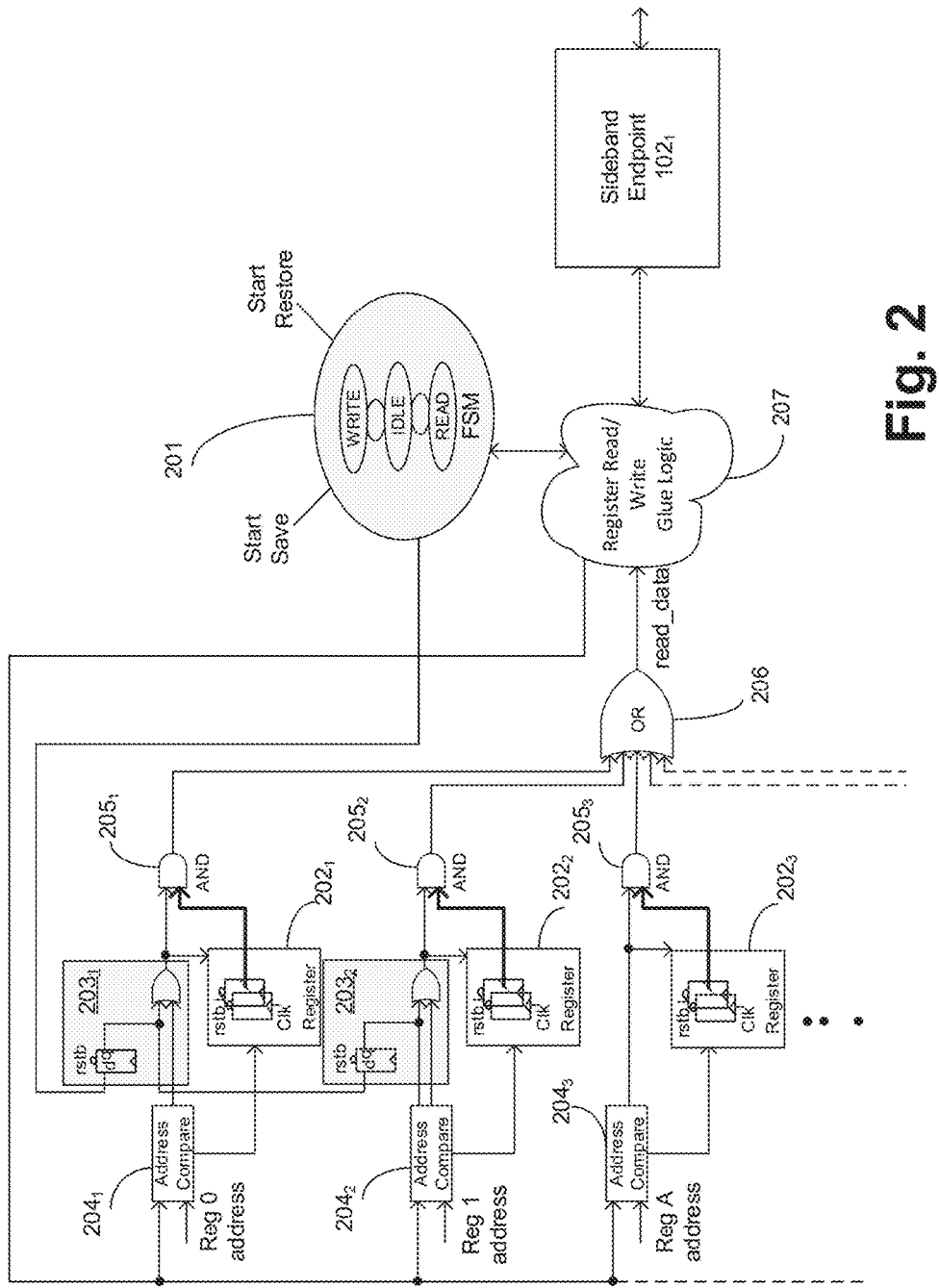
FIG. 2 illustrates part of an Intellectual Property (IP) block with an apparatus for efficient saving and restoring of data, according to some embodiments of the disclosure.

FIG. 2 illustrates part of IP Block 102$_1$ with apparatus for efficient saving and restoring of data, according to some embodiments of the disclosure. It is pointed out that those elements of FIG. 2 having the same reference numbers (or names) as the elements of any other figure can operate or function in any manner similar to that described, but are not limited to such.

In some embodiments, for purposes of saving and restoring data from and to the predetermined registers, IP Block 102$_1$ includes: FSM 201, registers 202$_{1-N}$ (where, 'N' is an integer), register logic 203$_{1-M}$ (where 'M' is an integer), Address Compare logic 204$_{1-N}$, and combination logics 205$_{1-N}$ and 206. In some embodiments, registers whose contents are to saved and restored during entering and exiting of power states are marked by having register logic 203 coupled to those registers. In this example, registers 202$_1$ and 202$_2$ are the registers of interest and identified for being saved and restored. As such, register logics 203$_1$ and 203$_2$ are coupled to registers 202$_1$ and 202$_2$, respectively.

In some embodiments, register logic 203$_1$ (same explanation applies to register logic 203$_2$) includes a sequential element (e.g., a flip-flop) and a logic gate such as an OR gate to provide a mechanism to override the read/write logic of register 202$_1$. Here, register logics 203$_1$ and 203$_2$ are sometimes referred to as register logic 203. In some embodiments, the sequential element is connected sequentially (e.g., the output 'q' of the sequential element from register logic 203$_1$ is connected to the input 'd' of the next sequential element of register logic 203$_2$).

As such, register logic are connected together in a daisy chain configuration and establish an order in which the contents of the registers of interest need to be saved/restored, in accordance with some embodiments. In some embodiments, the addition of the sequential element in register logic 203$_1$ assists with walking through all the register contents during a register save or read operation and also assists with restoring (i.e., writing back) the register contents during register restore operation.

In some embodiments, when FSM 201 receives an instruction (either from Control Unit 101 or directly from a power port), FSM 201 begins the "Start Save" operation. In some embodiments, FSM 201 enters a READ state from an IDLE state and drives a pulse (e.g., a high pulse) to the start of the override sequential unit in register logic $203_1$. As such, FSM 201 begins the process of walking through all the register contents in the daisy chain during the register save operation.

In some embodiments, the pulse is received by the port 'd' of the sequential unit of register logic $203_1$. On a next clock edge provided to the sequential unit, the sequential unit provides an output to the input port of the OR gate to enable the OR gate. As such, the subsequent AND gate $205_1$ (i.e., combination logic gate) is enabled (because the input provided from the OR gate is set to logic high). By enabling AND gate $205_1$, the content of register $202_1$ is provided to OR gate 206.

In some embodiments, Glue Logic 207 receives the content of register $202_1$ from the output of OR gate 206 and queues the content to be placed in the payload of the packet to be sent to Control Logic 101. On the following clock edge, the next sequential logic of register logic $203_2$ (in this example) in the daisy chain enables the OR gate of register logic $203_2$, and the same process continues. As such, contents of register $202_2$ are received by Glue Logic 207 which then places the content in the queue to be added to the payload. In some embodiments, when the packet is ready (i.e., contents of registers are queued and concatenated) and at the end of the register walk through, FSM 201 moves back to the IDLE state. In some embodiments, the concatenated register contents is then provided to Sideband Endpoint $102_1$ for transmission to Control Unit 101.

By saving the contents of the registers per IP block using register logic 203, the existing ROM size of Control Unit 101 is substantially reduced because register address information and data size information is not stored in the ROM. In some embodiments, a smaller size ROM may be included in Control Unit 101 to list any late addition of registers for saving/restoring purposes.

Figure 3:
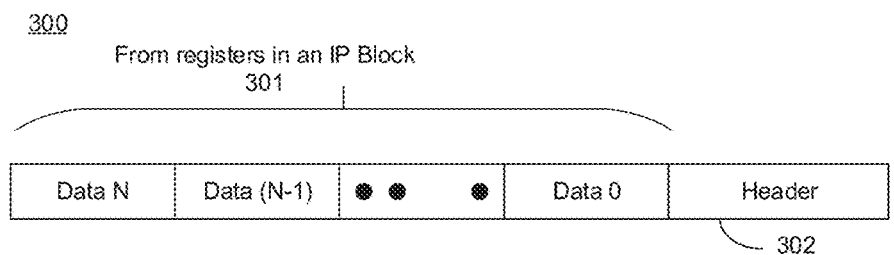
FIG. 3 illustrates a packet used for saving register data via an input-output (I/O) interface, according to some embodiments of the disclosure.

FIG. 3 illustrates packet 300 for sending register data during save operation via Sideband Endpoint $102_1$, according to some embodiments of the disclosure. It is pointed out that those elements of FIG. 3 having the same reference numbers (or names) as the elements of any other figure can operate or function in any manner similar to that described, but are not limited to such.

In some embodiments, packet 300 includes Payload 301 and Header 302. In some embodiments, Payload 301 receives data from registers in a sequential manner. In some embodiments, Glue Logic 207 (which is controlled by FSM 201) concatenates the register contents, as they are received, into a queue that then forms Payload 301. Here, Payload 301 is illustrated with 'N' Data regions, where 'N' is an integer. In this example, Data 0 corresponds to data content from register $202_1$, Data 2 corresponds to data content from register $202_2$, and so on for other predetermined registers (i.e., registers whose contents are to be saved) in IP Block $102_1$. In some embodiments, Header 302 includes information of the IP block to inform Control Logic 101 which IP block the data belongs to.

Referring back to FIG. 2, in some embodiments, when FSM 201 receives an instruction (either from Control Unit 101 or directly from a power down port) to exit from the power state, it begins the "Start Restore" operation. In some embodiments, FSM 201 decodes one or more packets received from Sideband Endpoint $102_1$. In some embodiments, the one or more packets are prepared by Control Logic 101 which reads register contents for IP Block $102_1$ from RAM 101a.

Figure 4:
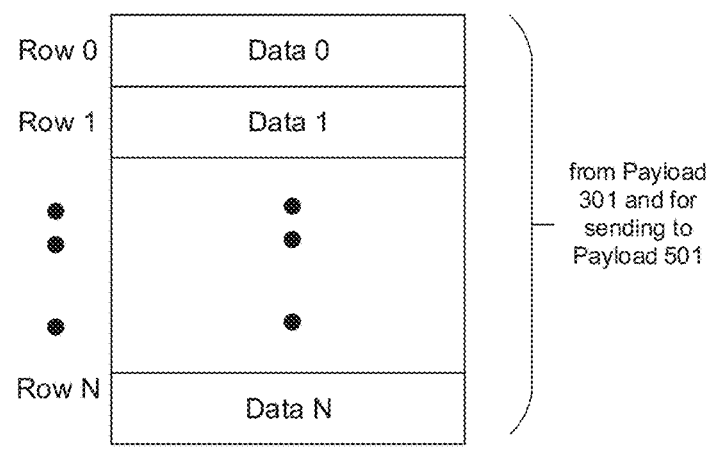
FIG. 4 illustrates a memory for storing the contents of the register data, according to some embodiments of the disclosure.

FIG. 4 illustrates memory 400 (e.g., RAM 101a) for storing the contents of the registers by Control Unit 101, according to some embodiments of the disclosure. It is pointed out that those elements of FIG. 4 having the same reference numbers (or names) as the elements of any other figure can operate or function in any manner similar to that described, but are not limited to such. Memory 400 can be any known memory structure. For example, memory 400 is a non-volatile memory having a plurality of rows. Here, memory 400 is illustrated with 'N' rows. In some embodiments, reach row (e.g., Row 0 through Row 'N') of RAM 101a stores data from Payload 301. For example, Row 0 stores Data 0 from Payload 301, Row 1 stores Data 1 from Payload 301, and so on. In some embodiments, FSM 101b retrieves the data from memory 400 and concatenates them for a transmitting payload to the IP block(s) during restore operation.

Figure 5:
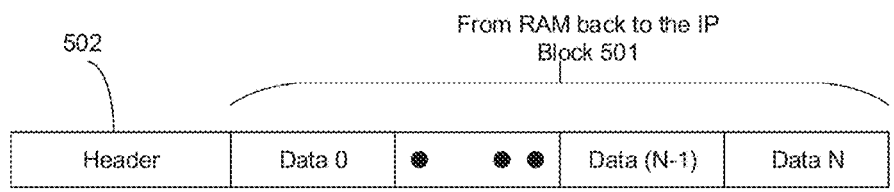
FIG. 5 illustrates a packet used for restoring register data via the I/O interface, according to some embodiments of the disclosure.

FIG. 5 illustrates packet 500 used for restoring register data via Sideband Endpoint $102_1$, according to some embodiments of the disclosure. It is pointed out that those elements of FIG. 5 having the same reference numbers (or names) as the elements of any other figure can operate or function in any manner similar to that described, but are not limited to such. In some embodiments, packet 500 includes Payload 501 and corresponding Header 502.

In some embodiments, Payload 501 receives data from memory 400 in a sequential manner. In some embodiments, FSM 101b concatenates the register contents from memory 400 into a queue that then forms Payload 501. Here, Payload 501 is illustrated with 'N' Data regions, where 'N' is an integer. In this example, Data 0 corresponds to data content from register $202_1$, Data 2 corresponds to data content from register $202_2$, and so on for other predetermined registers (i.e., registers whose contents are to be saved) in IP Block $102_1$. In some embodiments, Header 502 includes information of the IP block to which the data belongs.

Packet 500 is then transmitted by Control Unit 101 to IP Block $102_1$ via Sideband Fabric 104. In some embodiments, when Control Unit 101 sends multiple packets for various IP blocks, the Sideband endpoints of the IP blocks knows (from Header 502) which packet is addressed to it. As such, each IP block receives a packet that belongs to it.

Referring back to FIG. 2, in some embodiments, when registers in IP Block $102_1$ are to be restored, FSM 201 enters a WRITE state from the IDLE state and drives a pulse (e.g., a high pulse) to the start of the override sequential unit in register logic $203_1$. As such, FSM 201 begins the process of walking through all the registers of interest during the register restore operation. Here, the registers of interest are the registers to be restored using the data provided in Payload 501 of packet 500.

In some embodiments, the pulse is received by the 'd' port of the sequential unit of register logic $203_1$. On a next clock edge provided to the sequential unit, the sequential unit provides an output to the input port of the OR gate to enable the OR gate. In some embodiments, FSM 201 drives a write enable on receiving the restore Payload 501 of Packet 500. In some embodiments, the write enable is combined with logic $203_1$. As such, the output of OR gate is used to restore the contents to the register block. In some embodiments, the output pulse from the OR gate of register logic $203_1$ feeds to logic $202_1$, the output pulse from the OR gate of register logic $203_2$ feeds to logic $202_2$ and so on till the entire payload/registers are restored. In some embodiments, at the end of the register walk through, FSM 201 moves back to the IDLE state.

Figure 6:
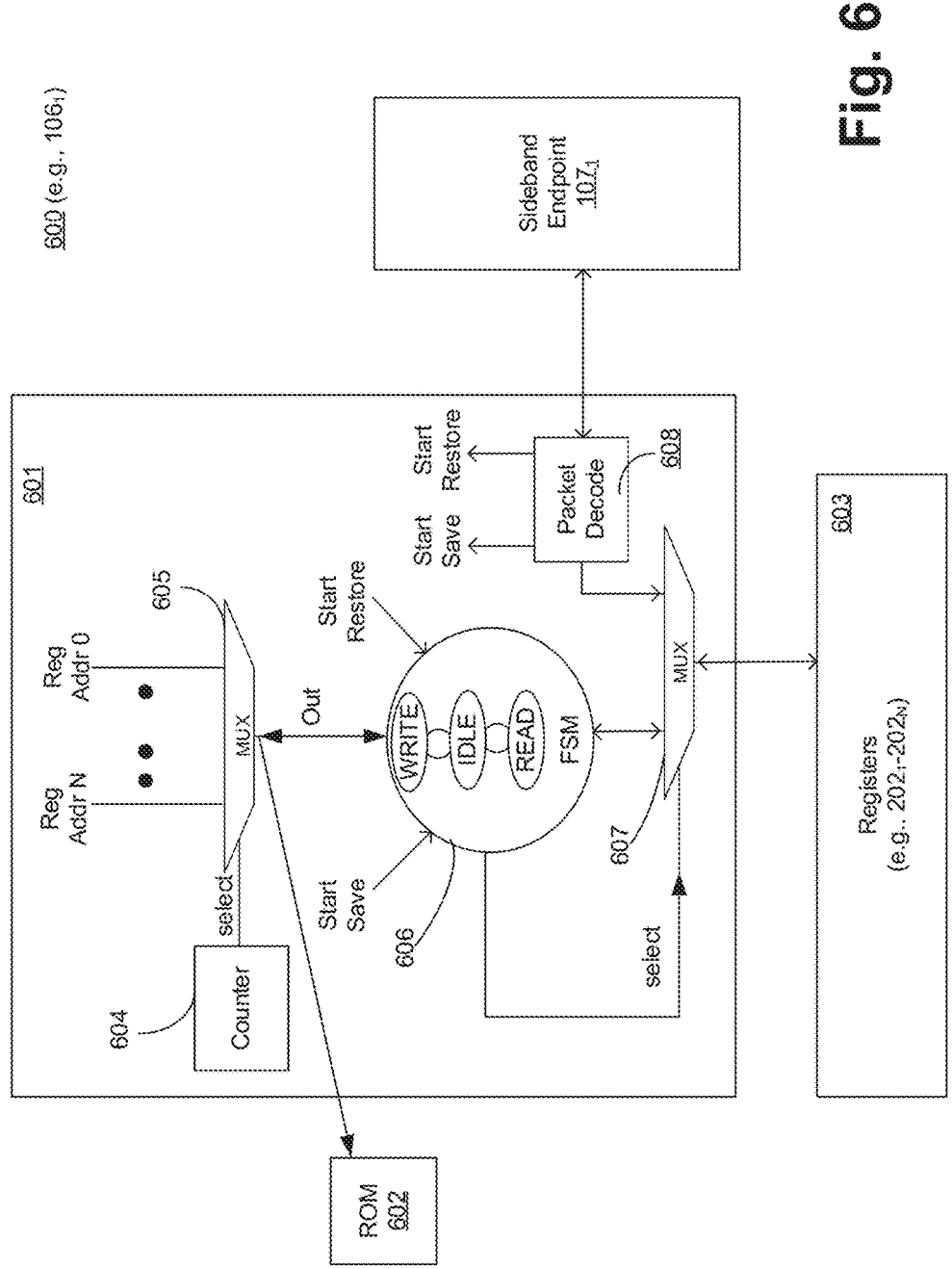
FIG. 6 illustrates part of an IP block with an apparatus for efficient saving and restoring of data, according to some other embodiments of the disclosure.

FIG. 6 illustrates part of an IP block 600 (e.g., 106$_1$) with an apparatus for efficient saving and restoring of data, according to some other embodiments of the disclosure. It is pointed out that those elements of FIG. 6 having the same reference numbers (or names) as the elements of any other figure can operate or function in any manner similar to that described, but are not limited to such.

In some embodiments, IP block 600 includes logic 601, ROM 602, Sideband Endpoint 107$_1$ and Registers 603 (e.g., 202$_1$-202$_N$). In some embodiments, logic 601 includes hardware for saving/restoring the contents of registers of interest which are part of Registers 603 (e.g., 202$_1$-202$_N$). In some embodiments, logic 601 includes Counter 604, multiplexer (MUX) 605, FSM 606, bi-directional MUX 607, and Packet Decode logic 608. Compared to the embodiment of FIG. 2, in IP Block 600, the addresses of registers of interest are known by ROM 602 inside IP Block 600.

In some embodiments, during the save operation (i.e., when FSM 606 receives the "Start Save" instruction and enters the READ state from the IDLE state) logic 601 reads the address from the ROM and retrieves the data content from Registers 603. This retrieved data is then queued. As such, data from all registers of interest are identified and queued. In some embodiments, the queued data is then concatenated by FSM 606 to form Payload 301. Payload 301 is then sent with corresponding Header 302 to Control Unit 101 where it is decoded as described with reference to FIGS. 2-4.

Referring back to FIG. 6, during the save operation, FSM 606 drives the enable for Counter 604, which in-turn acts as the address for ROM 602. In some embodiments, the read data from ROM 602 points to the register which needs to be saved. In some embodiments, FSM 606 fetches the register contents from Registers 603 using the read data from ROM 602. This process is repeated till all the ROM contents from ROM 602 are read out. As such, restore packet 300 is processed completely.

In some embodiments, during the restore operation (i.e., when FSM 606 receives the "Start Restore" instruction and enters the WRITE state from the IDLE state) logic 601 reads the address from the ROM and writes the data content decoded from incoming packet(s) to Registers 603 according to the read address. The process of forming Packet 500 which is received by Sideband Endpoint 107$_1$ is described with reference to FIGS. 2-5.

Referring back to FIG. 6, during the restore operation, FSM 606 drives the enable for Counter 604, which in-turn acts as the address for ROM 602. In some embodiments, the data read from ROM 602 points to the register which needs to be restored. In some embodiments, FSM 606 writes the register contents to Registers 603 using the address read from ROM 602. This process is repeated till all the ROM contents from ROM 602 are read out. As such, restore packet 500 is processed completely.

In some embodiments, Packet Decode logic 608 decodes the incoming packet to see if the packet is a "Save" or "Restore" packet. In some embodiments, Packet Decode logic 608 then decides whether to enable FSM 606 or send the request to the registers 603 directly (i.e., normal register read/write fall in that category).

Figure 7:
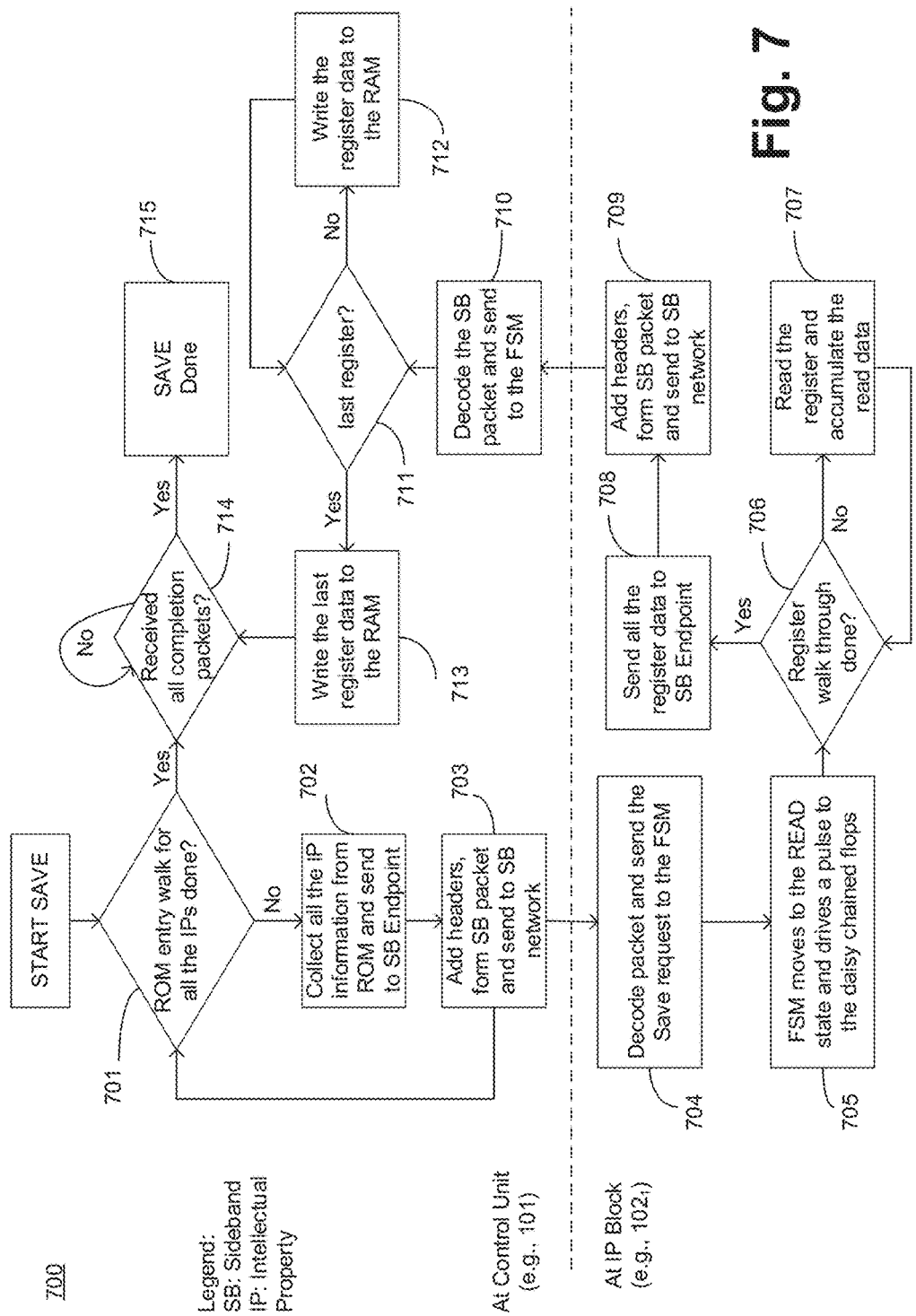
FIG. 7 illustrates a flowchart of a method for saving contents of the registers per IP block, according to some embodiments of the disclosure.

FIG. 7 illustrates flowchart 700 of a method for saving contents of the registers per IP block, according to some embodiments of the disclosure. It is pointed out that those elements of FIG. 7 having the same reference numbers (or names) as the elements of any other figure can operate or function in any manner similar to that described, but are not limited to such.

Although the blocks in the flowchart with reference to FIG. 7 are shown in a particular order, the order of the actions can be modified. Thus, the illustrated embodiments can be performed in a different order, and some actions/blocks may be performed in parallel. Some of the blocks and/or operations listed in FIG. 7 are optional in accordance with certain embodiments. The numbering of the blocks presented is for the sake of clarity and is not intended to prescribe an order of operations in which the various blocks must occur. Additionally, operations from the various flows may be utilized in a variety of combinations.

Flowchart 700 provides a method performed by Control Unit 101 and IP Block (e.g., IP Block 102$_1$) during the save operation. While the embodiments are described with reference to saving data from one IP block, the same process applies to saving register contents from multiple packets for different IP blocks.

At block 701, Control Unit 101 makes a determination whether a ROM in Control Unit 101 has any register information that needs to be provided to an IP block. For example, in the case of late additions of registers (i.e., after the hardware design is complete and adding register logic 203 is not possible, which is why information about those late registers are added to the ROM), Control Unit 101 checks for information associated with such late registers. In some embodiments, for backward compatibility with prior art ROM based save/restore operations, Control Unit 101 checks the ROM for information about the registers to be saved. In one such embodiment, if a determination is made that ROM entries are all packetized then the process proceeds to block 714, otherwise the process proceeds to block 702.

At block 702, Control Unit 101 collects all IP information from the ROM and sends it to the Sideband Endpoint of Control Unit 101. Here, IP information may include IP Block identification (e.g., which IP block that register data belongs to), register address, data size, etc. At block 703, packets are prepared for the register data and sent along with packet headers to IP blocks via Sideband Fabric 104 or network.

At block 704, IP Block 102$_1$ which is addressed by the packet header receives the packet(s) and decodes them. After decoding the packets, FSM 201 knows the additional registers which do not have register logic 203 but need their contents to be saved. The registers with register logic 203 coupled to them are the registers identified at design time whose contents are to be saved, in accordance with some embodiments.

At block 705, FSM 201 begins the SAVE operation (i.e., "Start Save") and enters the READ state from the IDLE state. FSM 201 then drives a pulse (e.g., a high pulse) to the daisy chained sequential units of register logic 203. In some embodiments, when there are no additional registers that were added to the ROM and/or when there is no need for backward compatibility to prior art schemes, the save operation can begin from block 705. As such, blocks 701, 702, and 703 are no longer needed, in accordance with some embodiments.

At block 706, register walk is performed as described with reference to FIG. 2. Referring back to FIG. 7, a determination is made at block 706 whether the register walk is complete through the daisy chain coupled registers. If the register walk is incomplete, the process proceeds to block 707 (which may be part of block 706) to read register content and accumulate the read data. If the register walk is complete (e.g., after all sequential units in register logic 203 have enabled their corresponding OR gates), FSM 201 sends all register data of registers of interest to Glue Logic 207 which concatenates the register data for insertion in Payload 301 section of Packet 300. At block 708, the concatenated data is then sent to Sideband interface $103_1$ along with Header 302.

At block 709, Header 302 is added to Payload 301 and register data from registers of interest is sent to Control Unit 101 via Sideband Fabric 104 for saving at the Control Unit 101 end. At block 710, Control Unit 101 receives Packet 300 and decodes it. In some embodiments, the process of decoding involves identifying register contents and IP block information from Payload 301 and Header 302. In some embodiments, the process of decoding is controlled or managed by FSM 101b.

At block 711, FSM 101b makes a determination whether the last register content has been detected from Payload 301. If more register contents are left for saving, at block 712, FSM 101b causes the register content decoded and read to be written to RAM 101a (e.g., RAM 400). If the contents being decoded are for the last register in Payload 301, then at block 713, the last register contents are saved or written to in RAM 101a and the process proceeds to block 714. At block 714, a determination is made whether all packets from IP Block $102_1$ are received and processed. If more packets are received from IP Block $102_1$ the process continues to decode and save register contents, otherwise the process is deemed complete at bock 715, in accordance with some embodiments. More packets than one may be received from IP Block $102_1$ if there are more register content than the maximum allowable payload size of Payload 301.

Figure 8:
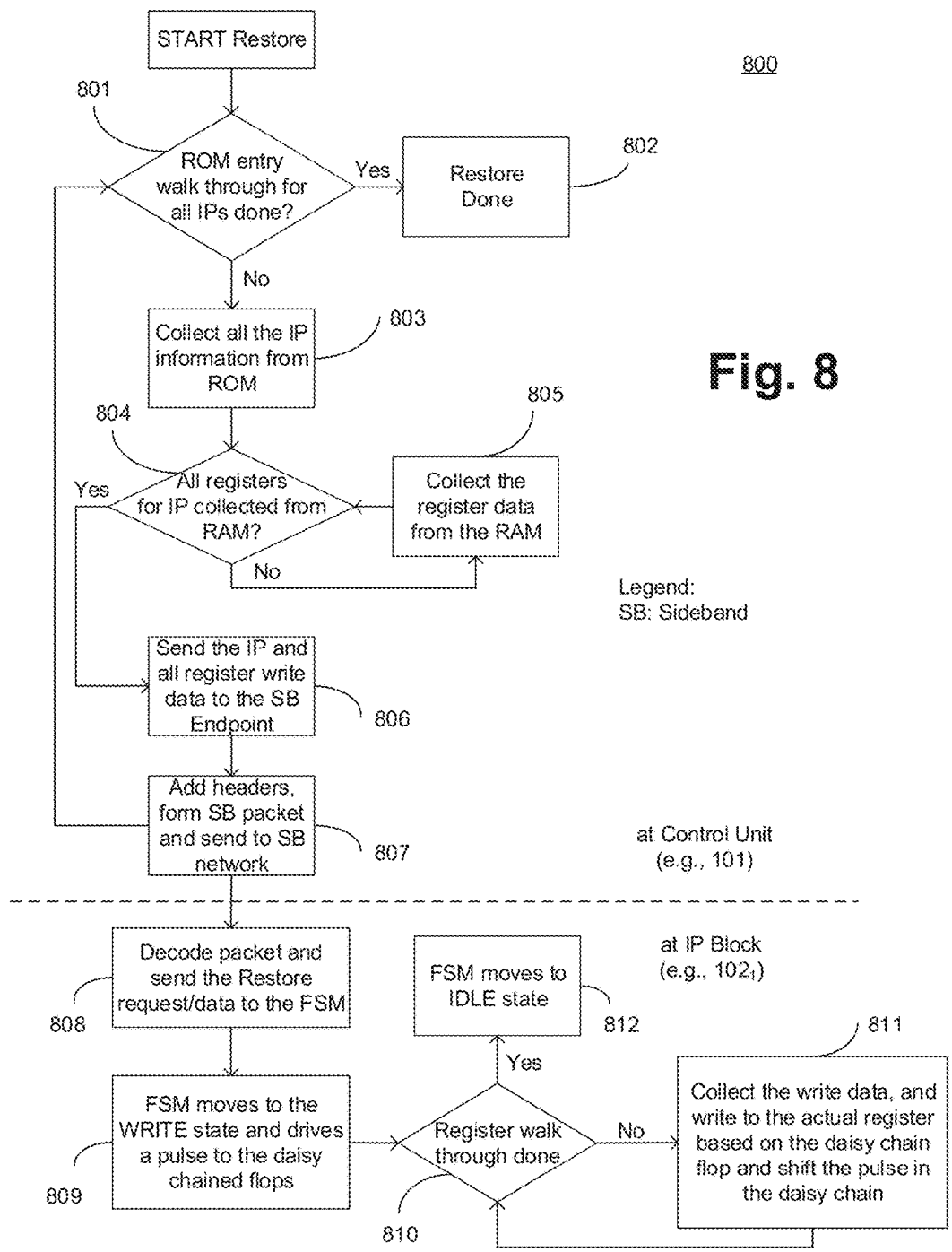
FIG. 8 illustrates a flowchart of a method for restoring contents of the registers per IP block, according to some embodiments of the disclosure.

FIG. 8 illustrates flowchart 800 of a method for restoring contents of the registers per IP block, according to some embodiments of the disclosure. It is pointed out that those elements of FIG. 8 having the same reference numbers (or names) as the elements of any other figure can operate or function in any manner similar to that described, but are not limited to such.

Although the blocks in the flowchart with reference to FIG. 8 are shown in a particular order, the order of the actions can be modified. Thus, the illustrated embodiments can be performed in a different order, and some actions/blocks may be performed in parallel. Some of the blocks and/or operations listed in FIG. 8 are optional in accordance with certain embodiments. The numbering of the blocks presented is for the sake of clarity and is not intended to prescribe an order of operations in which the various blocks must occur. Additionally, operations from the various flows may be utilized in a variety of combinations.

Flowchart 800 provides a method performed by Control Unit 101 and IP Block (e.g., IP Block $102_1$) during the restore operation. While the embodiments are described with reference to restoring data to one IP block, the same process applies to restoring register contents from multiple packets for different IP blocks.

At block 801, Control Unit 701 makes a determination whether the ROM in Control Unit 101 has any register information that needs to be provided to an IP block. For example, in the case of late additions of registers (i.e., after the hardware design is complete and adding register logic 203 is not possible, which is why information about those late registers are added to the ROM), Control Unit 101 checks for information associated with such late registers. In some embodiments, for backward compatibility with prior art ROM based restore operations, Control Unit 101 checks the ROM for information about the registers to be restored. In one such embodiment, if a determination is made that ROM entries for each IP have being processed (i.e., packetized) then the process proceeds to block 802, otherwise the process proceeds to block 803. At block 802, restore operation for the registers stored in ROM is considered complete.

At block 803, Control Unit 101 collects all IP information from the ROM and prepares to send it to the Sideband Endpoint of Control Unit 101. Here, IP information may include IP Block identification (e.g., which IP block that register data belongs to), register address, data size, etc. At block 804, a determination is made by FSM 101b whether all register data for the IP block are collected from RAM 101a (same as RAM 400). This process can be performed for one row in RAM 101a at a time, in accordance with some embodiments.

When all register data for the IP block are not yet collected or read from RAM 101a, the process proceeds to block 805. At block 805, register data from RAM 101a is collected and the process proceeds to block 804. In some embodiments, as register data from RAM 101a is read, it is queued for being concatenated with other register data read from RAM 101a for the same IP block. As such, block 806 may be performed along with block 804. In some embodiments, when all register data for all registers of interest are collected from RAM 101a, the register data are concatenated in Payload 501 of Packet 500.

In some embodiments, this process of concatenation is performed by block 806 at the Sideband (SB) Endpoint of Control Unit 101. At block 807, Header 502 is appended to Payload 501 to complete Packet 500 for sending to IP Block $102_1$ via Sideband Fabric 104. This process is repeated for generating packets associated with each IP block (which is why the process from block 807 may proceed back to block 801).

At block 808, IP Block $102_1$ receives Packet 500 and decodes Header 502 and Payload 501 of Packet 500 and sends an indication to FSM 201 to enter the RESTORE operation. At block 809, FSM 201 begins the RESTORE operation (i.e., "Start Restore") and enters the WRITE state from the IDLE state. FSM 201 then drives a pulse (e.g., a high pulse) to the daisy chained sequential units of register logic 203. In some embodiments, where there are no additional registers that were added to the ROM and/or where there is no need for backward compatibility to prior art schemes, the RESTORE operation can begin from block 804. As such, blocks 801, 802, and 803 are no longer needed, in accordance with some embodiments.

At block 810, a determination is made by FSM 201 whether register walk through is complete. Register walk is performed as described with reference to FIG. 2. Referring back to FIG. 8, if the register walk through is incomplete, the processor proceeds to block 811. Otherwise, the process proceeds to block 812. At block 811, Write data is collected from the decoded Payload 501 and written to the actual register of interest based on the daisy chain flip-flop. On the next clock edge, the next flip-flop of register logic 203 in the daisy chain is selected and data is then written to the register associated with that next flip-flop. In some embodiments, when all data is written back to the registers of interest, FSM 201 moves its state from the WRITE state to the IDLE state as indicated by block 812.

Figure 9:
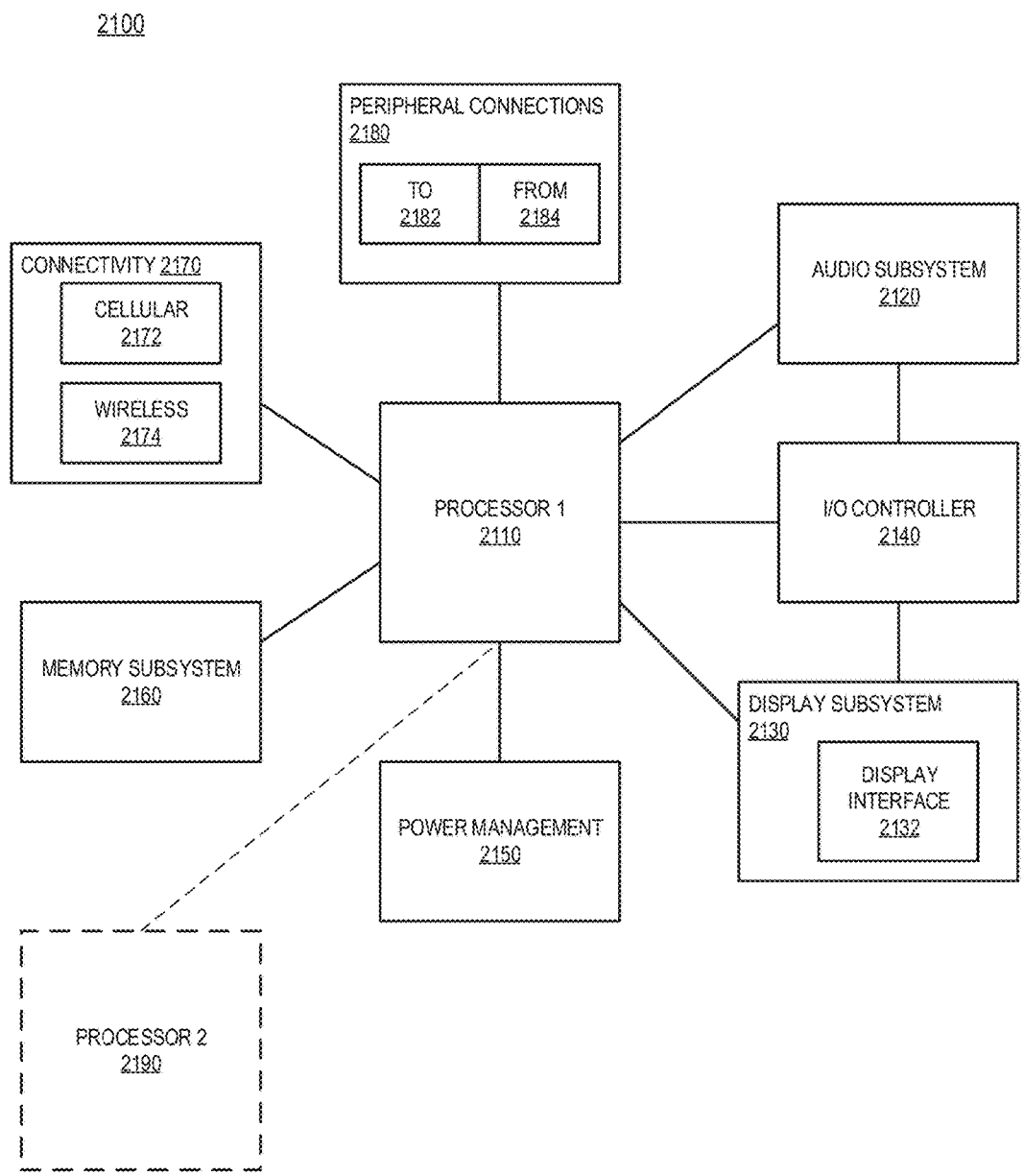
FIG. 9 illustrates a smart device or a computer system or a SoC (System-on-Chip) with IP blocks and logic which are operable for efficient saving and restoring of data, according to some embodiments of the disclosure.

FIG. 9 illustrates a smart device or a computer system or a SoC (System-on-Chip) with IP blocks and logic which are operable for efficient saving and restoring of data, according to some embodiments of the disclosure. It is pointed out that those elements of FIG. 9 having the same reference numbers (or names) as the elements of any other figure can operate or function in any manner similar to that described, but are not limited to such.

FIG. 9 illustrates a block diagram of an embodiment of a mobile device in which flat surface interface connectors could be used. In some embodiments, computing device 2100 represents a mobile computing device, such as a computing tablet, a mobile phone or smart-phone, a wireless-enabled e-reader, or other wireless mobile device. It will be understood that certain components are shown generally, and not all components of such a device are shown in computing device 2100.

In some embodiments, computing device 2100 includes a first processor 2110 (e.g., an IP block) which is operable for efficient saving and restoring of data, according to some embodiments discussed. Other blocks (e.g., other IP blocks) of the computing device 2100 may also include logic for efficient saving and restoring of data, according to some embodiments. The various embodiments of the present disclosure may also comprise a network interface within 2170 such as a wireless interface so that a system embodiment may be incorporated into a wireless device, for example, cell phone or personal digital assistant.

In one embodiment, processor 2110 (and/or processor 2190) can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O (input/output) with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 2180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, an apparatus is provided which comprises: an Intellectual Property (IP) block; control logic operable to send a first command to the IP block to cause the IP block to enter a first power state from a second power state; and a communicating fabric coupled to the IP block and to the control logic, the communicating fabric is to send multiple packets together with a first header from the IP block to the control logic after the first command is processed by the IP block, wherein the multiple packets are associated with multiple registers which are identified as registers whose contents are to be saved.

In some embodiments, the IP block comprises first logic to identify the registers whose contents are to be saved in response to receiving the first command. In some embodiments, the IP block comprises second logic to concatenate the contents from the identified registers as first packets with the first header for sending to the communicating fabric. In some embodiments, the control logic comprises: logic to decode the first header to retrieve the contents of the first packets associated with the identified registers; and a storage area to store the retrieved contents of the IP block.

In some embodiments, the control logic is operable to send a second command to the IP block to cause the IP block to exit from the first power state. In some embodiments, the control logic is operable to recover, from the storage area, the retrieved contents of the IP block. In some embodiments, the control logic is operable to concatenate the retrieved contents, recovered from the storage area, as second packets with a second header for transmitting via the communicating fabric.

In some embodiments, the first and second headers include information about the IP block. In some embodiments, the IP block comprises logic to decode the second header and the second packets and to copy the decoded second packets to the multiple registers identified as registers whose contents are to be restored. In some embodiments, the control logic is a power management control unit. In some embodiments, the first power state is a low power state and the second power state is a power state more active than the first power state.

In another example, a system is provided which comprises: a memory; a processor coupled to the memory, the processor including an apparatus according to the apparatus described above; and a wireless interface for allowing the processor to communicate with another device.

In another example, a method is provided which comprises: sending, by control logic, a first command to an Intellectual Property (IP) block to cause the IP block to enter a first power state from a second power state; and receiving by the control logic, via a communicating fabric coupled to the IP block and to the control logic, multiple packets together with a first header from the IP block, wherein the multiple packets are associated with multiple registers in the IP block which are identified as registers whose contents are to be saved.

In some embodiments, the contents from the identified registers are concatenated as first packets with the first header by the IP block for sending to the communicating fabric. In some embodiments, the method comprises: decoding the first header to retrieve the contents of the first packets associated with the identified registers; and storing, in a storage area, the retrieved contents of the IP block. In some embodiments, the method comprises sending a second command to the IP block to cause the IP block to exit from the first power state.

In another embodiments, the method comprises: recovering from the storage area the retrieved contents of the IP block; and concatenating the retrieved contents, recovered from the storage area, as second packets with a second header for transmitting via the communicating fabric to the IP block, wherein the IP block comprises logic to decode the second header and the second packets and to copy the decoded second packets to the multiple registers identified as registers whose contents are to be restored.

In another example, a system-on-chip (SoC) is provided which comprises: a plurality of Intellectual Property (IP) blocks including a processor core and a memory controller; a power control logic operable to send a first command to at least two IP blocks of the plurality of IP blocks to cause the at least two IP blocks to enter a first power state from a second power state; one or more communicating fabrics coupled to the at least two IP blocks and to the control logic, the one or more communicating fabrics to send multiple packets with associated one or more headers from each of the at least two IP blocks to the control logic, wherein the multiple packets are associated with multiple registers which are identified as registers whose contents are to be saved; and a wireless interface for allowing at least one of the IP block of the plurality of IP blocks to communicate with another device.

In some embodiments, the control logic is operable to: decode the one or more headers associated with each of the at least two IP blocks to retrieve the contents of the multiple packets associated with the identified registers; and store, in a storage area, the retrieved contents of each of the at least two IP blocks. In some embodiments, the control logic is operable to send a second command to the at least two of the IP blocks to cause each of the at least two IP blocks to exit from the first power state.

In some embodiments, the control logic comprises logic to: recover, for each of the at least two IP blocks, from the storage area the retrieved contents of that IP block; and concatenate the retrieved contents for each of the at least two IP blocks, recovered from the storage area, as second packets with a second header for transmitting via the communicating fabric to at least some of the IP block of the plurality of IP blocks, wherein each IP block comprises logic to decode the second header and the second packets and to copy the decoded second packets to the multiple registers identified as registers whose contents are to be restored in that IP block.

In another example, an apparatus is provided which comprises: means for sending, by control logic, a first command to an Intellectual Property (IP) block to cause the IP block to enter a first power state from a second power state; and means for receiving by the control logic, via a communicating fabric coupled to the IP block and to the control logic, multiple packets together with a first header from the IP block, wherein the multiple packets are associated with multiple registers in the IP block which are identified as registers whose contents are to be saved.

In some embodiments, the contents from the identified registers are concatenated as first packets with the first header by the IP block for sending to the communicating fabric. In some embodiments, the apparatus comprises: means decoding the first header to retrieve the contents of the first packets associated with the identified registers; and means for storing, in a storage area, the retrieved contents of the IP block. In some embodiments, the apparatus comprises means for sending a second command to the IP block to cause the IP block to exit from the first power state.

In some embodiments, the apparatus comprises: means for recovering from the storage area the retrieved contents of the IP block; and means for concatenating the retrieved contents, recovered from the storage area, as second packets with a second header for transmitting via the communicating fabric to the IP block, wherein the IP block comprises means to decode the second header and the second packets and means to copy the decoded second packets to the multiple registers identified as registers whose contents are to be restored.

In another example, a system is provided which comprises: a memory; a processor coupled to the memory, the processor including an apparatus according to the apparatus described above; and a wireless interface for allowing the processor to communicate with another device.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
   an Intellectual Property (IP) block;
   control logic operable to send a first command to the IP block to cause the IP block to enter a first power state from a second power state; and
   a communicating fabric coupled to the IP block and to the control logic, wherein the communicating fabric is to send multiple packets together with a first header from the IP block to the control logic after the first command is processed by the IP block, wherein the multiple packets are associated with multiple registers which are identified as registers whose contents are to be saved,
   wherein the IP block comprises a logic to identify the registers whose contents are to be saved in response to receiving the first command,
   wherein the registers whose contents are to be saved are identifiable by data stored in respective sequential circuits, wherein an individual sequential circuit of the respective sequential circuits includes a flip-flop and a logic gate coupled to the flip-flop,
   wherein the flip-flop is to store a data bit indicating that content of a corresponding register is to be saved,
   wherein the flip-flop is a first flip-flop, wherein the individual sequential circuit is a first sequential circuit, wherein the first flip-flop is coupled to a second flip-flop, of a second individual sequential circuit of the respective sequential circuits, in a chain configuration, and wherein the corresponding register is one of the multiple registers.

2. The apparatus of claim 1, wherein the logic is a first logic, and wherein the IP block comprises second logic to concatenate the contents from the identified registers as first packets with the first header for sending to the communicating fabric.

3. The apparatus of claim 2, wherein the control logic comprises:
logic to decode the first header to retrieve the contents of the first packets associated with the identified registers; and
a storage area to store the retrieved contents of the IP block.

4. The apparatus of claim 3, wherein the control logic is to send a second command to the IP block to cause the IP block to exit from the first power state.

5. The apparatus of claim 4, wherein the control logic is to recover, from the storage area, the retrieved contents of the IP block.

6. The apparatus of claim 5, wherein the control logic is to concatenate the retrieved contents, recovered from the storage area, as second packets with a second header for transmitting via the communicating fabric.

7. The apparatus of claim 6, wherein the first and second headers include information about the IP block.

8. The apparatus of claim 6, wherein the IP block comprises third logic to decode the second header and the second packets and to copy the decoded second packets to the multiple registers identified as registers whose contents are to be restored.

9. The apparatus of claim 1, wherein the control logic is a power management control unit.

10. The apparatus of claim 1, wherein the first power state is a low power state and the second power state is a power state more active than the first power state.

11. A method comprising:
sending, by control logic, a first command to an Intellectual Property (IP) block to cause the IP block to enter a first power state from a second power state; and
receiving by the control logic, via a communicating fabric coupled to the IP block and to the control logic, multiple packets together with a first header from the IP block, wherein the multiple packets are associated with multiple registers in the IP block which are identified as registers whose contents are to be saved,
wherein the IP block comprises logic to identify the registers whose contents are to be saved in response to receiving the first command,
wherein the registers whose contents are to be saved are identifiable by data stored in respective sequential circuits, wherein an individual sequential circuit of the respective sequential circuits includes a flip-flop and a logic gate coupled to the flip-flop,
wherein the flip-flop is to store a data bit indicating that content of a corresponding register is to be saved,
wherein the flip-flop is a first flip-flop, wherein the individual sequential circuit is a first sequential circuit, wherein the first flip-flop is coupled to a second flip-flop, of a second individual sequential circuit of the respective sequential circuits, in a chain configuration, and
wherein the corresponding register is one of the multiple registers.

12. The method of claim 11, wherein the contents from the identified registers are concatenated as first packets with the first header by the IP block for sending to the communicating fabric.

13. The method of claim 12 comprises:
decoding the first header to retrieve the contents of the first packets associated with the identified registers; and
storing, in a storage area, the retrieved contents of the IP block.

14. The method of claim 13 comprises sending a second command to the IP block to cause the IP block to exit from the first power state.

15. The method of claim 14 comprises:
recovering from the storage area the retrieved contents of the IP block; and
concatenating the retrieved contents, recovered from the storage area, as second packets with a second header for transmitting via the communicating fabric to the IP block,
wherein the logic of the IP block is a first logic, and wherein the IP block comprises second logic to decode the second header and the second packets and to copy the decoded second packets to the multiple registers identified as registers whose contents are to be restored.

16. A system-on-chip (SoC) comprising:
a plurality of Intellectual Property (IP) blocks including a processor core and a memory controller;
a power control logic operable to send a first command to at least two IP blocks of the plurality of IP blocks to cause the at least two IP blocks to enter a first power state from a second power state;
one or more communicating fabrics coupled to the at least two IP blocks and to the control logic, wherein the one or more communicating fabrics is to send multiple packets with associated one or more headers from each of the at least two IP blocks to the control logic, wherein the multiple packets are associated with multiple registers which are identified as registers whose contents are to be saved;
wherein an individual IP block, of the plurality of IP blocks, comprises a logic to identify the registers whose contents are to be saved in response to receiving the first command,
wherein the registers whose contents are to be saved are identifiable by data stored in respective sequential circuits, wherein an individual sequential circuit of the respective sequential circuits includes a flip-flop and a logic gate coupled to the flip-flop,
wherein the flip-flop is to store a data bit indicating that content of a corresponding register is to be saved,
wherein the flip-flop is a first flip-flop, wherein the individual sequential circuit is a first sequential circuit, wherein the first flip-flop is coupled to a second flip-flop, of a second individual sequential circuit of the respective sequential circuits, in a chain configuration, and
wherein the corresponding register is one of the multiple registers; and
a wireless interface to allow at least one of the IP block of the plurality of IP blocks to communicate with another device.

17. The SoC of claim 16, wherein the control logic is to:
decode the one or more headers associated with each of the at least two IP blocks to retrieve the contents of the multiple packets associated with the identified registers; and store, in a storage area, the retrieved contents of each of the at least two IP blocks.

18. The SoC of claim 16, wherein the control logic is to send a second command to the at least two of the IP blocks to cause each of the at least two IP blocks to exit from the first power state.

19. The SoC of claim 17, wherein the control logic comprises logic to:
- recover, for each of the at least two IP blocks, from the storage area the retrieved contents of that IP block; and
- concatenate the retrieved contents for each of the at least two IP blocks, recovered from the storage area, as second packets with a second header for transmitting via the communicating fabric to at least some of the IP block of the plurality of IP blocks,
- wherein each IP block comprises logic to decode the second header and the second packets and to copy the decoded second packets to the multiple registers identified as registers whose contents are to be restored in that IP block.

* * * * *